United States Patent [19]

Ray et al.

[11] Patent Number: 4,835,408
[45] Date of Patent: May 30, 1989

[54] POWER CONVERSION CIRCUIT

[75] Inventors: William F. Ray, Nottinghamshire; Rex M. Davis, Leicestershire, both of United Kingdom

[73] Assignee: Tasc Drives Limited, Cambridge, England

[21] Appl. No.: 488,547
[22] PCT Filed: Aug. 31, 1982
[86] PCT No.: PCT/GB82/00261
§ 371 Date: Apr. 6, 1983
§ 102(e) Date: Apr. 6, 1983
[87] PCT Pub. No.: WO83/00961
PCT Pub. Date: Mar. 17, 1983

[30] Foreign Application Priority Data

Sep. 8, 1981 [GB] United Kingdom ................. 8127136
Oct. 30, 1981 [GB] United Kingdom ................. 8132792

[51] Int. Cl.⁴ ............................................... H02J 1/10
[52] U.S. Cl. ........................................ 307/24; 307/34; 307/38; 263/96; 263/136
[58] Field of Search ........................ 307/15, 20, 24, 32, 307/34, 38, 39, 54, 61, 63, 77; 363/96–98, 132, 135–137, 160

[56] References Cited

U.S. PATENT DOCUMENTS 3,743,924  7/1973  Genuit et al. ..................... 307/34 X
3,935,528  1/1976  Brenneisen et al. ................. 363/79
4,092,509  5/1978  Mitchell ............................. 363/160
4,136,382  1/1979  Ricci ................................. 363/137
4,255,783  3/1981  Messer ............................... 363/96

Primary Examiner—Derek S. Jennings
Attorney, Agent, or Firm—Oblon, Fisher, Spivak, McClelland & Maier

[57] ABSTRACT

A multi-phase switched reluctance motor is driven from a tow-point d.v. supply (11) in which capacitors (12) and (13) are provided across the supply with their common point (14) constituting a third power supply point. The load windings $W_1$, $W_3$, $W_5$ and $W_2$, $W_4$, $W_6$ are connected in two different load circuits connected across the different capacitors. In order to prevent the voltage of the third point wandering because the currents in the the two load circuits are not the same, control means (21) can control the distribution of current between the various load windings by appropriate control of semi-conductor switches in the various load circuits.

13 Claims, 2 Drawing Sheets

FIG. I.

POWER CONVERSION CIRCUIT

This invention relates to a power conversion circuit comprising a direct voltage source having two capacitors connected across it in series, and one object of the invention is to provide a particularly convenient arrangement for supplying power from such a circuit to a number of loads. In one example, the loads are the load windings of a multi-phase switched reluctance motor, but they could equally well be individual loads or even the primary windings of a power transformer.

If the source is a three-point source established by two batteries connected in series, the mid-point or the common point of the two portions of the source will be held at a fixed potential, but if the source is a direct voltage source with two capacitors connected across it in series, as defined above, then the voltage of the common point of the two capacitors will tend to wander if the load currents taken from the two portions of the source are not the same, and the effect can be cumulative.

SUMMARY OF THE INVENTION

According to the present invention, there are two load circuits each comprising one or more loads, the loads in one load circuit being connected to the common point of the capacitors and to one side of the direct voltage source through individual controlled semi-conductor switches, and the loads in the other load circuit being connected between the said common point and the other side of the direct voltage source through individual controlled semi-conductor switches, and there are control means to control the semi-conductor switches, and means responsive to the potential of the said common point which tend to maintain that potential at a desired value.

Thus, if the currents in the two load circuits are not the same, so that the potential of the common point starts to wander, then the currents in the individual load circuits can be adjusted to compensate. In particular, the invention employs the idea of using the control means to control the instants of firing and commutating the semi-conductor switches to tend to produce that current balance.

In some circumstances the control means to control the instants of firing and commutating the semi-conducting switches to produce current balance may at the same time be arranged such that the operating frequencies in the two load circuits, defined by the the number of rises and falls of current per second in each circuit, are the same. This has the advantage of reducing the acoustic noise produced in the total load.

There may be two separate means, one responsive to the total current in one of the said load circuits and the other responsive to the total current in the other circuit. The control means may then fulfil two functions in response to the outputs of the said separate means. Firstly, it may control the semiconductor switches supplying power to the two load circuits in such a manner that the total current in both load circuits together corresponds to the total power requirement of the load.

The average current and power in each of the load circuits could take a multiplicity of values so long as the combination meets the total power requirement, and this would generally result in a departure of the potential of the said capacitor common point from its desired level. The second function of the control means is to prevent, or correct for, this departure, as is the object of the invention, by adjusting the firing of the said semiconductor switches so that the average current flowing into the said common point from the first load is equal to the average current flowing out of the said common point to the second load.

Alternatively, the first control function may be to set the current in one load at a value corresponding to the power requirement of the load, the value of current in the other load being of little or no consequence from the viewpoint of load power but being adjusted according to the second control function so that the average current flowing into the said common point from the first load is equal to the average current flowing out of the said common point to the second load.

The control means may include known measuring devices, hereinafter called meters, for measuring the departure of the said common point from its desired potential, and the separate means may include meters for measuring current.

Where each of the two separate means comprises a magnetic core linking its load circuit together with means for delivering an output dependent upon the flux density of the core, there may be a bias winding on each core arranged to produce a bias flux dependent upon the difference in potential between the said capacitor common point and one side of the supply, and that arrangement can produce the necessary balance between the currents so that the control means only has to control the switches so that the load power requirement is met.

The invention may be carried into practice in various ways, and one embodiment will now be described by way of example, with reference to the accompanying drawings.

DESCRIPTION OF THE PREFERRED EMBODIMENTS

Figure 1:
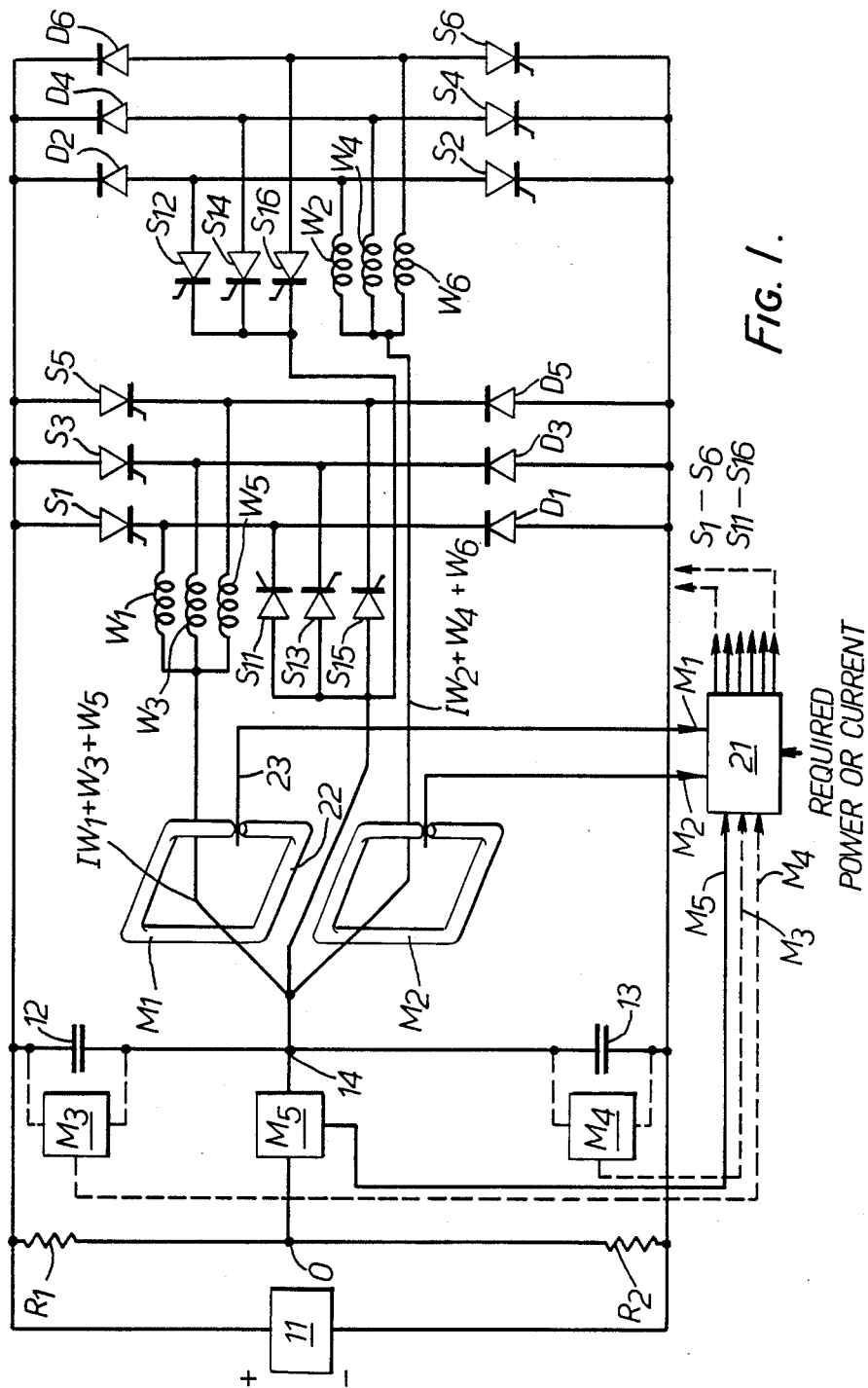
FIGS. 1 and 2 are respective circuit diagrams of power conversion circuits embodying the invention.

A d.v. source 11 which could be constituted by an electric storage battery or the output of a rectifier connected across the a.c. mains has connected across it two similar capacitors 12 and 13 in series. The common point 14 of the capacitors is connected to separate load circuits, each of which includes a number of loads $W_1$, $W_3$, $W_5$, or $W_2$, $W_4$ and $W_6$. The loads will normally be energised in sequence such that for each part of the cycle two or more loads are energised (for example $W_1$ and $W_2$ followed by $W_2$ and $W_3$ etc).

Loads $W_1$, $W_3$ and $W_5$ are in one load circuit and are connected each in series with its own controlled semi-conductor switch, $S_1$, $S_3$, or $S_5$, across the capacitor 12, so that when one switch is on, its load draws energy from capacitor 12. There is a diode $D_1$ connected between the negative side of the source 11 and the junction of the load $W_1$ and the switch $S_1$, so that when the switch $S_1$ is open, current flowing in the load $W_1$ can flow through the diode $D_1$ and return energy to the capacitor 13.

A controlled semi-conductor switch $S_{11}$ is connected across the load $W_1$ so that when the switch $S_{11}$ is on, current in the load $W_1$ can free-wheel through it.

It will be seen that except when free-wheeling the current in any of loads $W_1$, $W_3$, $W_5$, always flows into the common point 14 of the capacitors 12 and 13 thereby raising the potential at that point.

There is a similar arrangement for each of the six loads $W_1$ to $W_6$ but the loads $W_2$, $W_4$ and $W_6$ in the second load circuit are connected across the capacitor 13 rather than the capacitor 12.

It will be further seen that except when freewheeling the current in any of of the loads $W_2$, $W_4$, $W_6$ always flows out of the common point 14 thereby lowering the potential at that point.

An electronic control system 21 receives as an input a signal representing the required load power or current, and delivers control signals to the switches $S_1$ to $S_6$ and $S_{11}$ to $S_{16}$ to select the times during which those switches are on to enable the required power to be delivered.

That may be done by providing current meters $M_1$ and $M_2$ for the respective load circuits arranged to deliver two additional inputs to the control system 21 representing the currents in the two load circuits, and the control system controls the switches in such a way as to tend to keep the currents in the two load circuits at values which satisfy the load requirements.

The load requirements may be that the total sum of the currents in the respective load circuits approaches a desired value or may be that during each part of the operating cycle the current in one load approaches a desired value (as for a variable reluctance motor where each phase is energised in turn) or may be any known constant on the currents in one or more loads as appropriate to the type of load.

A particularly simple and cheap form of the current metering devices $M_1$ and $M_2$ consists of a magnetic core 22 encircling the load circuit supply path, and having a small gap containing a magnetosensitive resistor, or a Hall effect device 23.

The output from the magneto-sensitive resistor or Hall effect device is proportional to the flux density in the gap, and so to the current in the load circuit provided the magnetic core does not go into saturation.

Where the load power requirement is represented by the total sum of the currents in the respective load circuits, the switches $S_1$, $S_3$, and $S_5$ may be controlled by known chopping or other means to make the output of $M_1$ approach half the desired total value and similarly $S_2$, $S_4$ and $S_6$ may be controlled to make the output of $M_2$ approach half the desired total value.

In fact it is not possible to match current monitoring devices exactly for all current values, and if the average current in the first load circuit differs from the average current in the second load circuit, the potential at 14 will depart from the desired mid-potential since one capacitor will deliver more current than the other.

Such unbalance can have a cumulative effect, and accordingly, the potential at the point 14 is monitored, for example by a voltage monitor $M_5$ connected between the point 14 and the common point '0' between equal resistors $R_1$ and $R_2$ connected across the source 11. Excessive departure of the voltage at 14 from the mid-potential provides an input to the control system 21 which modifies its action in controlling the switches $S_1$ to $S_6$ and $S_{11}$ to $S_{16}$ so that they tend to balance the average currents in the two load circuits.

For example, if the potential at 14 is greater than the desired mid-potential, the signal level from $M_5$ may be used to decrease the average current monitored by $M_1$ and increase the average current monitored by $M_2$ thereby drawing a net current from 14 such that the potential at 14 decreases. If the changes to the currents monitored by $M_1$ and $M_2$ cause a change in total load power represented by the sum of $M_1$ and $M_2$, then both currents may be increased (or decreased as appropriate) so as to return the total current to its desired level.

An alternative to the monitor $M_5$ and the resistors $R_1$ and $R_2$ is a pair of voltage metering devices $M_3$ and $M_4$ connected across the respective capacitors 12 and 13.

The difference between the outputs of $M_3$ and $M_4$ then represents the departure of point 14 from its desired mid-potential.

Where the loads $W_1$ to $W_6$ in FIG. 1, are the phase windings of a switched reluctance motor, the load requirement may be to maintain the current in each winding in turn between specified levels $L_1$ and $L_2$ as indicated at the input to the control system 21. During the one-sixth part of the complete cycle for which $W_1$ for example has a maintained specified current, winding $W_2$ is also energised so as to provide the current balance at the capacitor common point 14.

One method of controlling the switches to obtain this current balance where there are inputs to the control system 21 from the current meters $M_1$ and $M_2$, and from the voltage monitor $M_5$ operates in the following way.

First of all the switch $S_1$ is fired so that the first phase winding $W_1$ draws an increasing current from capacitor 12 and the potential at point 14 rises above its desired mid-potential value. When the current as measured at $M_1$ reaches its upper level $L_1$, the switch $S_1$ is commutated and switch $S_{11}$ is fired so that the current in winding $W_1$ free-wheels through $S_{11}$. Since the free-wheeling current does not flow through the capacitors 12 and/or 13, it does not change the potential at point 14.

At the same time as switch $S_{11}$ is fired, $S_2$ is fired so that the winding $W_2$ draws an increasing current from the supply at point 14, and the potential at point 14 falls.

The voltage at 14 is monitored by the monitor $M_5$ and at the correct voltage the switch $S_2$ is commutated and the switch $S_{12}$ is fired so that current in the winding $W_2$ can free-wheel through the switch $S_{12}$ and there will be in consequence no further change of the potential at 14. The currents in windings $W_1$ and $W_2$ will continue to free-wheel until the current in $W_1$ falls to its lower level $L_2$ whereupon switch $S_1$ is fired and switch $S_{12}$ is commutated. The current in $W_2$ transfers to diode $D_2$ and flows out of point 14, decreasing under the reverse voltage across $W_2$ until it falls to zero. The current in $W_1$ flows into point 14, increasing until it reaches its specified upper lever $L_1$. The net result is that the potential at point 14 increases above its desired mid potential value.

$S_1$ is then commutated and $S_{11}$ and $S_2$ fired as before when the potential at 14 falls to its correct value $S_2$ is commutated and $S_{12}$ fired and the process is repeated whilst the current in $W_1$ is maintained between its specified limits $L_1$ and $L_2$. The potential at point 14 is repeatedly returned to its desired level and hence current balance is maintained at 14.

When the one-sixth period of control of $W_1$ has been completed, $S_1$ is finally commutated and the current in $W_1$ transfers to $D_1$ and falls to zero. At a suitable time $S_2$ is fired and the current in $W_2$ increases to $L_1$. Energisation of $W_2$ with $W_3$ being used for the purpose of current balance then continues in the same way as for $W_1$ and $W_2$ followed by $W_3$ and $W_4$ and so on until the cycle is completed with $W_1$ and $W_2$ again.

This method of operation for obtaining current balance has the additional advantage that the operating frequencies (i.e. the number of rises and falls of current per second) in the top load circuit and the bottom load circuit are the same.

It is to be appreciated that each of the switches $S_1$ to $S_6$, and $S_{11}$ to $S_{16}$, which are shown as thyristors in FIG. 1, will have means for commutating it, for example, as described in British Patent Specification No. 8127135 (Case TASC 1).

The arrangement shown in FIG. 1 has the capability of allowing the currents in the windings to freewheel through the switches $S_{11}\ldots S_{16}$. This freewheeling may give certain advantages in the operation of the load. However, it is not necessary to have this freewheeling capability to satisfy the objective of the present invention in maintaining current balance at the capacitor junction point 14 such that the potential at this point is kept at its desired value.

For example in the arrangement shown in FIG. 1 suppose the switches $S_{11}\ldots S_{16}$ are removed. The current in $W_1$ may be maintained between two set levels $L_{11}$ and $L_{12}$ by firing $S_1$ whenever the current is less than $L_{12}$ so that the current increases and by commutating $S_1$ whenever the current is greater than $L_{11}$ so that the current decreases according to the well known principle of chopping.

Similarly the current in $W_2$ may be maintained between two levels $L_{21}$ and $L_{22}$ by the appropriate firing and commutation of $S_2$.

The differential between the levels $L_{11}$–$L_{12}$ and $L_{12}$–$L_{22}$ may be set to constant values by the controller 21, and the power in the load may be raised (or lowered) by raising (or lowering) the levels $L_{11}$, $L_{12}$. The potential at point 14 is maintained at its desired value by adjusting the levels $L_{21}$, $L_{22}$. For example if the potential at 14 is too high as measured by $M_5$, then $L_{21}$ and $L_{22}$ will be raised so as to draw more current through $W_2$ until the potential at 14 is restored to its desired value. The adjustment of $L_{21}$, $L_{22}$, by the controller 21 under the feedback measurement from $M_5$ follows the well known principle of feedback control.

Hence, whilst $L_{11}$, $L_{12}$, may be adjusted by controller 21 to give the desired power in the loads, $L_{21}$, $L_{22}$ may be simultaneously adjusted to give the desired current balance and maintain point 21 at its desired potential.

Similarly current balance may be achieved using loads $W_2$ and $W_3$ or $W_3$ and $W_4$ or indeed any one or any combination of $W_1$, $W_3$, $W_5$ together with any one or any combination of $W_2$, $W_4$, $W_6$. Furthermore the roles played by $W_1$ and $W_2$ in the above description may be reversed, i.e. $W_2$ may be used to control load power, and $W_1$ under the corrective action of the feedback measurement $M_5$ may be used to maintain the current balance.

As a further example it is not necessary to chop the load currents between controlled levels in order to fulfill the objective of the invention. Consider the case that $S_1$ is fired and when the current has reached a level $L_1$, $S_1$ is commutated, the current then falling to zero. Pulses of current are thus injected into winding $W_1$ at a frequency $f_1$. In similar manner, by firing $S_2$ and commutating $S_2$ when the current has reached a level $L_2$, pulses of current are injected into winding $W_2$ at frequency $f_2$.

The frequencies $f_1$, $f_2$, may be kept constant by the controller 21, the power may be controlled by varying level $L_1$, and the voltage at point 21 maintained by varying $L_{21}$ in the manner described above.

Alternatively, the levels $L_1$, $L_2$, may be kept constant by the controller 21 and the power controlled by varying frequency $f_1$ and the voltage at point 21 maintained by varying $f_2$. For example, if the potential at 14 is too high as measured by $M_5$ then $f_2$ will be raised so as to draw more current through $W_2$ until the potential at 14 is restored to its desired value.

Figure 2:
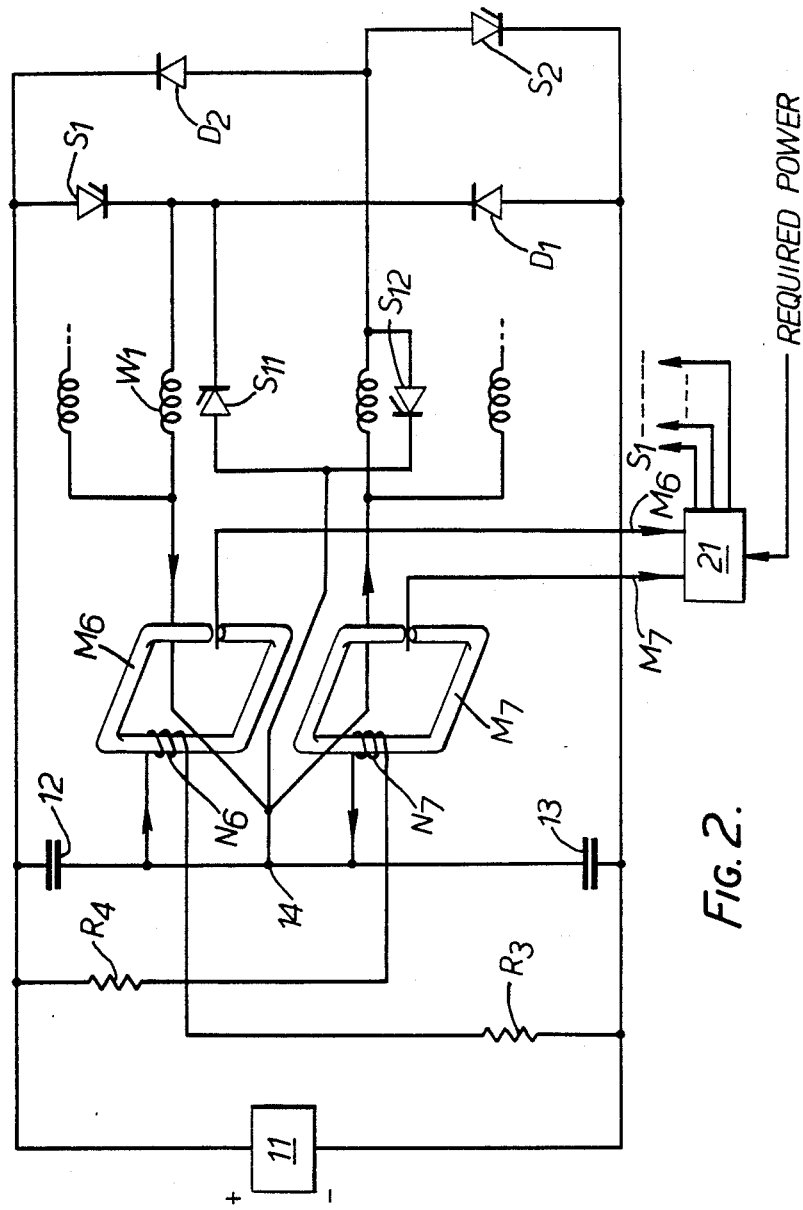

In the arrangement shown in FIG. 2, although the load could once again be a multi-phase switched reluctance motor, it is shown merely as four windings, two in each load circuit, and they could be windings of a four-phase transformer. In order to simplify the figure, the full connections have only been shown for the windings $W_1$ and $W_2$ with their switches $S_1$, $S_{11}$ and $S_2$, $S_{12}$ and their diodes $D_1$ and $D_2$. Each of the switches S is shown as a thyristor and then there will be a commutating arrangement for each of the switches. Alternatively, it is possible to use transistors in place of the thyristors. The switches $S_{11}$, $S_{12}$, may be omitted if freewheeling is not required.

In the example of FIG. 2, the use of the voltage metering devices $M_3$ and $M_4$ or $M_5$ is avoided by providing on the cores of the two current metering devices $M_6$ and $M_7$ bias windings $N_6$ and $N_7$ which are connected between the common point 14 of the capacitors 12 and 13, and the negative (or positive) side of the source 11 through a resistor $R_3$ or $R_4$.

The load requirement is to maintain approximately equal currents in the two load circuits, the level of current being raised (or lowered) according to the said first function of the control means until the load power is correct.

If the current in the first load circuit exceeds that in the second load circuit, the voltage of the point 14 will become more positive, and so the current in the bias winding $N_6$ which is proportional to the voltage across the capacitor 13 will increase, and for a similar reason the current in the bias winding $N_7$ will decrease.

Now the control system 21 is acting to maintain equal flux densities in the cores of the metering devices $M_6$ and $M_7$ so that the extra current in the bias winding $N_6$ will be offset by a reduction in the first load current, and the desired correcting action is thus achieved until the voltage of the point 14 is restored.

It will be seen that this corrective action is achieved by adding the bias windings $N_6$ and $N_7$ to the existing metering cores $M_1$ and $M_2$ of the system shown in FIG. 1 whereby the metering devices $M_5$, $M_3$ and $M_4$ may be eliminated.

The resistors $R_3$, $R_4$ of FIG. 2 may require some series inductance (not shown) to facilitate a satisfactory transient response for the separate means $M_6$ and $M_7$ according to known techniques, or may be replaced by current sources dependent on the voltages across the capacitors $C_1$, $C_2$. In either case the balancing principle described above remains the same.

We claim:
1. A power conversion circuit comprising:
a direct voltage source having two capacitors connected in series, with each other across the source to define a common point, two load circuits each comprising one or more loads,
the loads in one load circuit being connected to the common point of the capacitors and to one side of the direct voltage source through individual controlled semi-conductor switches, and
the loads in the other load circuit being connected between the said common point and the other side of the direct voltage source through individual controlled semi-conductor switches, and all of the loads being directly connected to the said common point, the power conversion circuit involving means responsive to the potential of the said common point, and control means for controlling the semi-conductor switches in accordance with the responsive means, to tend to maintain the potential of the said common point at a desired value.

2. A circuit as claimed in claim 1 including means responsive to the current in each of one or more loads arranged to control the semi-conductor switch for that load.

3. A circuit as claimed in claim 2 in which the switches are controlled to maintain the currents in the loads between respective set levels, which levels may be adjusted.

4. A circuit as claimed in claim 2 including means arranged to render the semi-conductor switches conducting at respective controllable frequencies and to render them non-conducting at certain controllable current levels.

5. A circuit as claimed in claim 1 including circuits including semi-conductor devices enabling each load to return energy to one or other of the said capacitors.

6. A circuit as claimed in claim 1 in which the control means is arranged in response to any difference between the potential of the said common point and a reference potential to control the semi-conductor switches to tend to reduce the said difference.

7. A circuit as claimed in claims 1 or 6 including two separate means, each responsive to the total current in one of the load circuits, the control means being arranged to control the semi-conductor switches to tend to cause the outputs of the two separate means to be equal.

8. A circuit as claimed in claim 7 in which each of the two separate means comprises a magnetic core linking its load circuit and means for delivering an output dependent upon the flux density in the core.

9. A circuit as claimed in claim 8 including on each core a bias winding arranged to produce a bias flux dependent upon the different in potential between the said common point and one side of the source.

10. A circuit as claimed in claim 1 in which the control means is arranged to control the semi-conductor switches to set the current in one load at a value corresponding to the power requirement of that load.

11. A circuit as claimed claims 1 or 10 in which the control means is arranged to control the instants of firing and commutating the semi-conductor switches so that the number of rises and falls of current per second in the two load circuits are the same.

12. A circuit as claimed in claim 1 including two separate means, each responsive to the total current in one of the load circuits, the control means being arranged in response to the outputs of the said separate means to control the semi-conductor switches to tend to cause the average total current in both load circuits together to correspond to the total power requirement of the load.

13. A circuit as claimed in claim 7 including two separate means, each responsive to the total current in one of the load circuits, the control means being arranged in response to the outputs of the said separate means to control the semi-conductor switches to tend to cause the average total current in both load circuits together to correspond to the total power requirement of the load.

* * * * *